United States Patent Office 3,706,695
Patented Dec. 19, 1972

3,706,695
METHOD OF PREPARING A SILICONE EMULSION AND REGENERATING SAME AND ELECTRICALLY CONDUCTIVE PRODUCT
David J. Huebner, Williams Township, Bay County, and Michael D. Meddaugh, Midland, Mich., assignors to Dow Corning Corporation, Midland, Mich.
No Drawing. Filed Oct. 12, 1970, Ser. No. 80,179
Int. Cl. H01b 1/04; C08g 31/34, 53/22
U.S. Cl. 117—226                           20 Claims

ABSTRACT OF THE DISCLOSURE

An emulsion prepared by dissolving a surface active sulfonic acid in water, adding polydiorganosiloxane, homogenizing the mixture, heating to polymerize the siloxane, adding a nonionic emulsifying agent, neutralizing, adding carbon black, and thereafter adding an organometallic catalyst and an alkoxysilane, provides a heat stable electrically conductive silicone rubber when the water is removed.

This invention relates to a method of preparing a silicone emulsion.

Pressures are being placed on today's industry to avoid dangerous materials and reduce the amount of pollutants released into the environment. Thus, the need for eliminating organic solvents from processes and products is being demanded. However, many processes and products require fluid conditions to function properly. Since many materials are only soluble in organic solvents, therefore new technology must be developed to eliminate the organic solvent. One area which is receiving attention as a means of eliminating the use of organic solvent is the aqueous emulsion and/or dispersion. However, processes and products which are based on the use of organic solvents cannot be merely dispersed or emulsified in an aqueous medium to provide equivalent results. New processes and new compositions are required when an aqueous medium is to replace an organic solvent medium. Whereas useful processes and products have been successful when organic solvents were used, the conversion to an aqueous medium result in completely useless processes and products unless changes are made. Silicones, such as silicone rubber, have been successfully used in organic solvent systems and in the bulk, but attempts to convert the organic solvent systems or bulk systems to aqueous systems have been, at best, only partially successful.

Silicone emulsions are known in the art. For example, Hyde et al. in U.S. Pat. No. 2,891,920 decribes a method for preparing emulsions of organosiloxanes by polymerizing organosiloxanes such as cyclic polydiorganosiloxanes with strong mineral acids or strong alkalis while the cyclic polydiorganosiloxane was emulsified in an aqueous medium. Findlay et al. in U.S. Pat. No. 3,294,725 describes a method for preparing emulsions of siloxanes by polymerizing organosiloxanes with surface active sulfonic acids while the organosiloxane was dispersed in an aqueous medium.

A number of means are available for conducting electricity, such as metals, carbon and more recently conductive synthetic materials such as rubber. Electrically conductive rubber offers a number of advantages that metal conductors or carbon conductors do not have. The electrically conductive rubber has the rubber properties as well as being electrically conductive, thus providing uses not obtainable with metal or carbon. However, metal and carbon have an advantage over rubber in that they can be used in higher temperature conditions without being destroyed.

It is therefore an object of the present invention to provide a method of making a silicone emulsion which can be used to provide electrically conductive silicone rubber which is heat stable, thus providing a heat stable electrically conductive silicone rubber which eliminates organic solvents which are potentially both dangerous and pollutants to the environment. This object and others will become more apparent from the following detailed description.

This invention relates to a method for preparing an emulsion which can form a heat stable electrically conductive silicone consisting essentially of (A) dissolving a surface active sulfonic acid in water wherein the surface active sulfonic acid is an organic sulfonic acid in which the organic group is composed of carbon and hydrogen or carbon, hydrogen and oxygen in the form of an ether oxygen, said organic group containing at least 12 carbon atoms, said surface active sulfonic acid being present in an amount of from 0.01 to 2 weight percent based on the weight of siloxane in (B), said water being present in an amount of from 40 to 95 inclusive weight percent based on the weight of siloxane in (B), (B) mixing into the solution obtained in (A) siloxane selected from the group consisting of polydiorganosiloxane cyclics, hydroxyl endblocked polydiorganosiloxanes having a viscosity no greater than 200 cs. at 25° C. and mixtures thereof, wherein the silicon-bonded organic groups are selected from the group consisting of methyl, ethyl, phenyl, vinyl and 3,3,3-trifluoropropyl, at least 90 percent of the total organic groups are methyl, (C) homogenizing the mixture obtained in (B) to provide a stable dispersion, (D) heating the dispersion at a temperature of from 25° C. to 95° C. for at least one hour whereby the siloxane polymerizes, (E) adding to the resulting product of (D) a nonionic emulsifying agent in an amount of from 1 to 10 weight percent based on the weight of the siloxane, thereafter (F) neutralizing the surface active sulfonic acid to provide an emulsion having a pH of from 6.5 to 9 inclusive, whereby a polydiorganosiloxane having a viscosity of from 2000 to 100,000 cs. at 25° C. inclusive is obtained in an emulsion, (G) mixing into the emulsion obtained in (F) finely divided carbon black in an amount of from 8 to 35 weight percent based on the combined weight of the siloxane and carbon black, and thereafter, (H) adding to the emulsion, 0.005 to 5 weight percent based on the weight of the siloxane of a metallic salt of a carboxylic acid wherein the metal is selected from the group consisting of zinc, lead, cobalt, iron and tin, and 0.5 to 10 weight percent based on the weight of the siloxane of a silane of the formula $RSi(OR')_3$ wherein R is a monovalent radical selected from the group consisting of hydrocarbon and halogenated hydrocarbon radicals having from 1 to 18 inclusive carbon atoms and R' is an alkyl radical having from 1 to 6 inclusive carbon atoms.

The emulsion is prepared by dissolving a surface active sulfonic acid in water. The surface active sulfonic acid is present in an amount of from 0.01 to 2 weight percent based on the weight of the siloxane, preferably the surface active sulfonic acid is present in an amount of from 0.1 to 1 weight percent. The amount of water used is from 40 to 95 weight percent based on the weight of the siloxane preferably from 60 to 90 weight percent. If the amount of surface active sulfonic acid is above 2 weight percent, the heat stability of the resulting silicone rubber is reduced to a level which is unacceptable at temperatures above 175° C. for example.

Siloxane is added to the aqueous surface active sulfonic acid solution in amounts to provide a mixture containing from 40 to 95 weight percent water. The siloxane can be added in any desired manner, such as all at once, slowly over a period of time, in increments and the like.

The temperature under which the additions are made, are not narrowly critical, however, temperatures which approach 100° C. or temperatures above 100° C. are not particularly suitable since boiling tends to destroy any resulting dispersion.

After the siloxane has been added, the mixture is homogenized to provide a stable dispersion. The best means for homogenizing the mixture is to pass it through a homogenizing apparatus. Many such homogenizing apparatus are commercially available. The mixture can be passed through a homogenizer as many times as desired as long as a stable dispersion results. Two or three passes are usually suitable.

The resulting stable dispersion is then heated to 25° C. to 95° C. for at least one hour. Since the lower temperatures, 25° C. up to 70° C. take longer for the polymerization, the higher temperatures, 70° C. to 95° C. are preferred. At 90° C., for example, the polymerization is sufficient in 3 to 5 hours to provide a polydiorganosiloxane having a viscosity within the limits set forth above.

After the polymerization has taken place for at least one hour, a nonionic emulsifying agent is added in an amount of from 1 to 10 weight percent based on the weight of the siloxane. It is necessary to add the nonionic emulsifying agent at this point of the process. If added before or during the polymerization, the polymerization is inhibited. The nonionic emulsifying agent is required to keep the dispersion in an emulsified state during the remainder of the process.

After the nonionic emulsifying agent is added, the surface active sulfonic acid is neutralized to a pH of from 6.5 to 9, preferably 6.8 to 8. The particular means of neutralization is not narrowly critical and any of the well known means can be used. The best results are obtained when a dilute solution of an alkali hydroxide, alkali carbonate or alkali bicarbonate are used such as sodium hydroxide, potassium hydroxide, sodium carbonate, potassium carbonate, sodium bicarbonate and potassium bicarbonate. The temperature at which the surface active sulfonic acid is neutralized is not narrowly critical, however, it is preferred to cool the emulsion and neutralize at a temperature of 40° C. to 70° C.

The polydiorganosiloxane polymer obtained has a viscosity of from 2000 to 100,000 cs. at 25° C., preferably from 20,000 to 40,000 cs. at 25° C. The viscosities of the polydiorganosiloxanes discussed herein refer to the viscosity of the polydiorganosiloxane per se and not to the viscosity of the emulsion.

The emulsion at this point is ready to receive the finely divided carbon black which provides the electrically conductive property to the silicone rubber. The carbon black can be any of the finely divided commercial carbon blacks, which are used as fillers, particularly those known to be highly electrically conductive. The finely divided carbon black is added in the amount of from 8 to 35 weight percent based on the combined weight of the siloxane and the carbon black. The carbon black can be added in any suitable manner, however, it is preferred to just stir in the finely divided carbon black. The carbon black readily disperses in the emulsion with a minimum of agitation. The emulsion prepared in this manner neither breaks nor is there required any special procedures needed to add the carbon black.

After the carbon black has been added, an organometallic catalyst in the amount of 0.005 to 5 weight percent based on the weight of the siloxane and an alkoxysilane in the amount of from 0.5 to 10 weight percent based on the weight of the siloxane is added. The emulsion prepared in this manner is stable and can be used to coat substrates by dipping the substrate into the emulsion. The emulsion coats the dipped substrate, and as the water evaporates the coating cures to a heat stable electrically conductive silicone rubber. There is no need to heat the deposition from the emulsion to cure it to a silicone rubber, however, heating can be used. Heating should not be excessive so that the curing silicone rubber blisters or forms voids from the escaping water vapor. This emulsion can also be used to deposit a silicone rubber by evaporating the water from the emulsion, in this case no substrate is needed, just a container for the emulsion.

The emulsion containing both the organometallic catalyst and the alkoxysilane will cure to a useful silicone rubber up to two weeks or longer. Although the emulsion remains stable, the depositions do not cure satisfactorily after long storage or use. Thus, for purposes of storage the emulsion is prepared and stored in two or more packages. One package can contain the emulsion after the carbon black has been added and another package can contain the alkoxysilane and organometallic catalyst. The alkoxysilane and organometallic catalyst need not be kept in a single container but can also be kept in separate containers. Furthermore, either the organometallic catalyst or the alkoxysilane can be added to the emulsion after the carbon black has been added and the other stored in a separate container. When the emulsion is to be used to deposit the heat stable electrically conductive silicone rubber, the two or more packages are mixed and the emulsion will provide a silicone rubber which will cure at room temperature and have electrical conductive properties and also have heat stability.

After the emulsion becomes ineffective in depositing a curable silicone rubber, it can be regenerated. The emulsion is regenerated by adding additional organometallic catalysts, alkoxysilane or both. The amounts used should preferably be about the same as originally used in preparing the emulsion. By regenerating the emulsion both of the emulsions can be used for a month or more without replacing the entire emulsion. This has many apparent advantages on a production line where substrates are being dipped. The emulsion can readily be regenerated once or twice, but caution should be used when attempting to regenerate the emulsion more than two times. Preferably the emulsion is regenerated by adding alkoxysilane or both alkoxysilane and organometallic catalyst.

The silicone rubber prepared from the emulsion of this invention is sufficiently electrically conductive and heat stable to be usable as the conductor for an ignition cable on an engine.

The surface active sulfonic acids are well known in the art. The surface active sulfonic acids are organic sulfonic acids in which the organic group is composed of carbon and hydrogen and can also contain oxygen as an ether linkage. The organic groups contain at least 12 carbon atoms. The organic sulfonic acids can be aromatic or aliphatic sulfonic acids. Aromatic sulfonic acids are the alkylaryl sulfonic acids wherein the aryl radical can be benzene, naphthalene or diphenylether. The alkyl group of the alkylaryl sulfonic acids can be either linear or branched. Thus, illustrative of the alkyl benzene sulfonic acid is dodecylbenzene sulfonic acid, and tridecylbenzene sulfonic acid, both linear and branched and illustrative of the alkylnaphthalene sulfonic acid is butylnaphthalene sulfonic acid and nonylnaphthalene sulfonic acid, both linear and branched. The aliphatic sulfonic acids include the paraffin base sulfonic acids, linear and branched alkyl sulfonic acids.

The surface active sulfonic acids suitable for the present invention are those having at least 12 carbon atoms in the organic radical to provide a surface active property which provides a dispersion of the siloxane in water which is stable enough to be used. The surface active sulfonic acids must also be water dispersible. The classes of surface active sulfonic acids which are suitable in the present method are the alkylbenzene sulfonic acids, the alkylnaphthalene sulfonic acids, the alkyl sulfonic acids and the alkyldiphenylether sulfonic acids. Of these, the alkylbenzene sulfonic acids having at least 15 carbon atoms are preferred.

The siloxanes used in the present method include the polydiorganosiloxane cyclics and hydroxyl endblocked polydiorganosiloxanes having a viscosity no greater than 200 cs. at 25° C. The organic groups are selected from methyl, ethyl, phenyl, vinyl and 3,3,3-trifluoropropyl where at least 90 percent of the organic groups are methyl radicals, preferably at least 98 percent of the organic groups are methyl radicals. The cyclic polydiorganosiloxanes can be any of the well known cyclic polydiorganosiloxanes which have three or more diorganosiloxane units per molecule. The hydroxyl endblocked polydiorganosiloxanes are well known in the art and can be purchased commercially.

The nonionic emulsifying agent can be any of the well known nonionic emulsifying agents which include, for example, saponins, condensation products of fatty acids with ethylene oxide such as dodecyl ether of tetraethylene oxide, condensation products of ethylene oxide and sorbitan trioleate, condensation products of phenolic compounds having side chains with ethylene oxide such as condensation products of ethylene oxide with isododecylphenol and imine derivatives such as polymerized ethylene imine and N-octadecyl-N,N'-ethylene imide.

The alkoxysilane is a silane of the formula $RSi(OR')_3$ in which R is a monovalent hydrocarbon or halogenated hydrocarbon radical having from 1 to 18 inclusive carbon atoms and R' is an alkyl radical having from 1 to 6 inclusive carbon atoms such as methyl, ethyl, propyl, isopropyl, pentyl and hexyl. R can be illustrated by monovalent hydrocarbon radicals such as methyl, ethyl, propyl, isopropyl, butyl, pentyl, isopentyl, neopentyl, hexyl, octyl, dodecyl, octadecyl, 3-methylheptyl, 2,2-diethylpentyl, vinyl, allyl, hexenyl, butenyl, 3-octenyl, 4,9-octadecadienyl, 4-nonenyl, propynyl, heptynyl, butynyl, decynyl, 1-penten-3-ynyl, cyclobutyl, cyclopentyl, cyclohexyl, cycloheptyl, propylcyclohexyl, 2,4-dimethylcyclopentyl, cyclohexenyl, bicyclo[3.1.0]hexyl, spiro[4.5]decyl, decahydronaphthyl, phenyl, tolyl, xylyl, 3-ethylphenyl, xenyl, naphthyl, 3,4-methylethylphenyl, 2-phenyloctyl, benzyl, 2 - ethyltolyl, 2-ethyl-p-cymyl, 2-phenylethyl and 2 - phenylpropyl; and monovalent halogenated hydrocarbon radicals such as chloromethyl, 3-chloropropyl, 3,3,3 - trichloropropyl, perfluorovinyl, chlorooctadecyl, radicals of the formula $R_fCH_2CH_2$— where $R_f$ can be any perfluoroalkyl group such as trifluoromethyl, perfluoroethyl, perfluoroisobutyl, perfluoroheptyl and perfluorodecyl, dichlorophenyl, tetrabromoxenyl, tetrachlorophenyl, alpha,alpha,alpha-trifluorotolyl, iodonaphthyl, chlorocyclohexyl, bromocyclopentyl, chlorocyclohexenyl, chlorobenzyl and beta-(chlorophenyl) ethyl. Preferably R and R' are both methyl radicals.

The metallic salts of a carboxylic acid wherein the metal is zinc, lead, cobalt, iron or tin are well known in the art for the condensation of silicon bonded alkoxy radicals with silanols and the condensation of silanols with silanols. These metallic salts of carboxylic acids can be exemplified by zinc naphthenate, lead naphthenate, cobalt naphthenate, iron 2-ethylhexoate, cobalt octoate, zinc octoate, lead octoate, tin octoate, carbomethoxyphenyltin trisuberate, isobutyltin triceroate, cyclohexenyl lead triacotinate, xenyl lead trisalicylate, dimethyl tin dibutyrate, dibutyl tin diacetate, dibutyl tin dilaurate, divinyl tin diacetate, dibutyl tin dibenzoate, dibutyltin dioctoate, dibutyl tin maleate, dibutyl tin adipate, diisoamyl tin bistrichlorobenzoate, diphenyllead diformate, dibutyl tin dilactate, dicyclopentyl lead bis-monochloroacetate, dibenzyl lead di-2-pentanoate, diallyl lead di-2-pentanoate, triethyl tin tartrate, tributyl tin acetate, triphenyl tin acetate, tricyclohexyl tin acrylate, tritolyl tin terephthalate, tri-n-propyl lead acetate, tristearyl lead succinate, trinaphthyl lead p-methylbenzoate, triphenyl lead cyclohexenyl acetate, triphenyl lead ethylmalonate, stannous laurate, stannous o-thymotate, stannous betabenzoylpropionate, stannous tropate, stannous p-bromobenzoate, stannous palmitoleate, stannous acetate, stannous stearate, stannous oleate, stannous linoleate, stannous naphthenate, stannous benzoate, stannous succinate, stannous sebacate, stannous lactate, stannous maleate, stannous crotonate, stannous salicylate, stannous phthalate, stannous mandelate, stannous cinnamate, stannous salt of phenyl acetic acid, tin recinoleate, tin naphthenate, iron stearate, tin butyrate, lead sebacate, lead 2-ethylhexoate, tributyltin monolaurate, plumbous octoate, and plumbic tetraoctoate. The preferred metallic salts of the carboxylic acids are the class of diorganotin carboxylate as illustrated above.

The method of the present invention is useful in preparing emulsions which are useful in providing depositions of heat stable electrically conductive silicone rubber. The silicone rubber deposited on a substrate by dipping or by laying down a film by evaporation of the water is electrically conductive. This electrically conductive deposit cures by evaporation of water at room temperature to provide a silicone rubber. This silicone rubber is electrically conductive and sufficiently heat stable to be usable as a conductive core for an ignition cable for an engine.

The method of the present invention has several advantages such as the use of water which is not a dangerous material to handle or which can pollute the environment when discarded or evaporated. Furthermore, a room temperature curable silicone rubber is obtained from an aqueous emulsion whereas prior art methods have required room temperature curable silicone compositions be stored under anhydrous conditions. Additional advantages are present in that the emulsion can be regenerated after it will no longer provide a curable silicone rubber at room temperature.

The following examples are for illustrative purposes only and should not be construed as limiting the present invention which is properly delineated in the claims.

EXAMPLE 1

To 1609 g. of distilled water, 6.0 g. of dodecylbenzene sulfonic acid was added. After the dodecylbenzene sulfonic acid dissolved, 1200 g. of a mixture of cyclic siloxanes having from 3 to 8 dimethylsiloxane units per molecule was stirred into the solution. The resulting mixture was passed through a commercial homogenizer twice at 4,500 p.s.i. The resulting dispersion was heated at 90° C. for 4 hours, cooled to 40° C. After being held at 40° C. for 2.5 hours, 54 g. of an alkyl phenoxy polyoxyethylene ethanol nonionic emulsifier was added. The resulting emulsion was neutralized with 79 g. of a 0.25 N solution of sodium hydroxide. The resulting polydimethylsiloxane had a viscosity of about 25,000 cs. at 25° C. The emulsion contained 35 weight percent polydimethylsiloxane.

To 120 g. of the above emulsion, 3.4 g. of the nonionic emulsifier and 55.2 g. of distilled water was added and stirred into the emulsion. At this point, 18 g. of Vulcon XC–72 carbon black (fluffy form) was slowly added and stirred in. The carbon black containing emulsion was then catalyzed with 2.1 g. of a mixture of 20 weight percent dibutyltin dilaurate in polydimethylsiloxane fluid and 1.3 g. of methyltrimethoxysilane. A sample of the emulsion was allowed to evaporate at room temperature in a polystyrene petri dish and after seven days a rubbery film was obtained having a durometer of 60 on the Shore A scale, a tensile strength at break of 270 p.s.i., an elongation at break of 250 percent and a tension set of 30 percent. The rubber film had a volume resistivity of $6.39 \times 10^3$ ohm-cm. The heat stability of the film was determined by heating the film at a given temperature over a period of time and observing the length of time the film took to become brittle. The film was heat stable for 3 days at 200° C. and 11 days at 175° C. To another sample of the emulsion 4 parts of barium zirconate was added and a cured rubber film had a heat stability of 11 days at 200° C. and 42 days at 175° C.

EXAMPLE 2

Using the procedure described in Example 1 except the amount of carbon black was varied, the following conductive properties of cured silicone rubber films were observed.

| Weight percent carbon black: | Volume resistivity, ohm-cm. |
|---|---|
| 4.5 | $1.86 \times 10^{14}$ |
| 8.6 | $2.11 \times 10^{5}$ |
| 15.8 | $2.07 \times 10^{5}$ |
| 20.0 | $1.01 \times 10^{4}$ |
| 22.5 | $9.98 \times 10^{3}$ |
| 25.0 | $9.03 \times 10^{3}$ |
| 30.0 | $6.39 \times 10^{3}$ |

EXAMPLE 3

The effects of using excessive amounts of organic sulfonic acid were observed by varying the amount of the sodium salt of dodecylbenzene sulfonic acid in an emulsion having 75 weight percent polydimethylsiloxane and 25 weight percent carbon black based on the weight of the polydimethylsiloxane and the carbon black. The sodium salt was added to the resulting emulsion prepared in the manner as described in Example 1. The cured rubber films were heat aged at 200° C. and the time to become brittle was determined.

| Weight percent of the sodium salt of dodecylbenzene sulfonic acid: | Heated stability, days before brittle |
|---|---|
| 0.5 | 13 |
| 1.0 | 11 |
| 2.0 | 8 |
| 4.0 | 7 |

EXAMPLE 4

The effect of carbon black concentration and barium zirconate on the heat stability was observed by varying the weight percentage of carbon black in an emulsion prepared as described in Example 1. The heat aging was carried out at 200° C. and the amount of barium zirconate was 4 parts by weight per 100 parts by weight of emulsion solids.

| Weight percent | | Heat stability, days | |
|---|---|---|---|
| Polydimethylsiloxane | Carbon black | No BaZrO$_3$ | With BaZrO$_3$ |
| 80 | 20 | 11 | 19 |
| 75 | 25 | 8 | 14 |
| 70 | 30 | 3 | 11 |

EXAMPLE 5

The conductivity was determined as a cured rubber from an emulsion prepared as described in Example 1 and deposited on a glass fiber substrate by dip coating. The emulsion solids were 70 weight percent polydimethylsiloxane and 30 weight percent carbon black. The conductivity was determined by measuring the resistance.

| | Ohm/ft. | |
|---|---|---|
| Time, days | 232° C. | 204° C. |
| 0 | 3,750 | 2,600 |
| 1 | 2,300 | 2,300 |
| 2 | 1,500 | 2,350 |
| 3 | | 2,000 |
| 4 | 1,550 | 1,400 |
| 5 | 1,650 | |
| 6 | 1,700 | 1,200 |
| 7 | 1,900 | 1,200 |
| 8 | 2,200 | 1,300 |
| 9 | (Brittle) | 1,350 |
| 10 | | 1,350 |
| 11 | | 1,450 (Brittle) |

EXAMPLE 6

When the procedure of Example 1 is used and the viscosity of the resulting polydimethylsiloxane is 2,000 cs. at 25° C., 20,000 cs. at 25° C., 40,000 cs. at 25° C. or 100,000 cs. at 25° C., an emulsion is obtained which cures at room temperature to a silicone rubber when the water evaporates and the cured silicone rubber is heat stable and electrically conductive.

EXAMPLE 7

The emulsion prepared in Example 1 is regenerated after two weeks by adding 1.3 g. of methyltrimethoxysilane to 120 g. of the emulsion. The resulting emulsion thereafter cures to an equivalent silicone rubber film. To another 120 g. of the emulsion prepared in Example 1 being in use for two weeks, 1.3 g. of methyltrimethoxysilane and 2.1 g. of a mixture of 20 weight percent dibutyltin dilaurate in polydimethylsiloxane fluid is added. The resulting emulsion is regenerated and provides equivalent cured silicone rubber films as described in Example 1.

That which is claimed is:

1. A method for preparing an emulsion which can form a heat stable electrically conductive silicone rubber consisting essentially of
    (A) dissolving a surface active sulfonic acid in water wherein the surface active sulfonic acid is an organic sulfonic acid in which the organic group is composed of carbon and hydrogen or carbon, hydrogen and oxygen in the form of an ether oxygen, said organic group containing at least 12 carbon atoms, said surface active sulfonic acid being present in an amount of from 0.01 to 2 weight percent based on the weight of siloxane in (B), said water being present in an amount of from 40 to 95 inclusive weight percent based on the weight of siloxane in (B),
    (B) mixing into the solution obtained in (A) siloxane selected from the group consisting of polydiorganosiloxane cyclics, hydroxyl endblocked polydiorganosiloxanes having a viscosity no greater than 200 cs. at 25° C. and mixtures thereof, wherein the silicon-bonded organic groups are selected from the group consisting of methyl, ethyl, phenyl, vinyl and 3,3,3-trifluoropropyl, at least 90 percent of the total organic groups are methyl,
    (C) homogenizing the mixture obtained in (B) to provide a stable dispersion,
    (D) heating the dispersion at a temperature of from 25° C. to 95° C. for at least one hour whereby the siloxane polymerizes,
    (E) adding to the resulting product of (D) a nonionic emulsifying agent in an amount of from 1 to 10 weight percent based on the weight of the siloxane, thereafter
    (F) neutralizing the surface active sulfonic acid to provide an emulsion having a pH of from 6.5 to 9 inclusive, whereby a polydiorganosiloxane having a viscosity of from 2000 to 100,000 cs. at 25° C. inclusive is obtained in an emulsion,
    (G) mixing into the emulsion obtained in (F) finely divided carbon black in an amount of from 8 to 35 weight percent based on the combined weight of the siloxane and carbon black, and thereafter,
    (H) adding to the emulsion, 0.005 to 5 weight percent based on the weight of the siloxane of a metallic salt of a carboxylic acid wherein the metal is selected from the group consisting of zinc, lead, cobalt, iron and tin, and 0.5 to 10 weight percent based on the weight of the siloxane of a silane of the formula RSi(OR')$_3$ wherein R is a monovalent radical selected from the group consisting of hydrocarbon and halogenated hydrocarbon radicals having from 1 to 18 inclusive carbon atoms and R' is an alkyl radical having from 1 to 6 inclusive carbon atoms.

2. The method in accordance with claim 1 in which the siloxane is a polydiorganosiloxane cyclic, the temperature in the heating step (D) is from 70° C. to 95° C. and the product obtained in (D) is cooled to 40° C. to 70°

C. prior to adding the nonionic emulsifying agent and neutralizing the surface active sulfonic acid.

3. The method in accordance with claim 2 in which the amount of water is from 60 to 90 weight percent based on the weight of the siloxane and the surface active sulfonic acid is neutralized with a compound selected from the group consisting of sodium hydroxide, potassium hydroxide, sodium bicarbonate, sodium carbonate, potassium bicarbonate and potassium carbonate.

4. The method in accordance with claim 1 in which R' is methyl.

5. The method in accordance with claim 4 in which R is methyl.

6. The method in accordance with claim 4 in which the metallic salt of the carboxylic acid is a diorganotin carboxylate.

7. The method in accordance with claim 6 in which the diorganotin carboxylate is selected from the group consisting of dibutyltin dilaurate, dibutyltin diacetate, and dibutyltin dioctoate.

8. The method in accordance with claim 1 in which the amount of carbon black is from 20 to 35 weight percent inclusive based on the combined weight of the siloxane and carbon black.

9. The method in accordance with claim 1 in which the viscosity of the polydiorganosiloxane obtained in step (F) is from 20,000 to 40,000 cs. at 25° C. inclusive.

10. The method in accordance with claim 1 in which there is also added after step (F), a compound selected from the group consisting of barium zirconate, calcium carbonate, sodium carbonate or mixtures thereof in amounts not exceeding 10 weight percent based on the weight of the siloxane.

11. The method in accordance with claim 1 in which a substrate is coated with a film from the emulsion prepared in claim 1.

12. The method in accordance with claim 11 in which the substrate is coated by dipping the substrate into a bath of the emulsion.

13. The method in accordance with claim 11 in which the coated substrate is dried by evaporating the water from the emulsion.

14. The method in accordance with claim 1 in which a coherent film of a silicone rubber is formed by evaporating the water from the emulsion.

15. The emulsion prepared by the method of claim 1.

16. The emulsion prepared by the method of claim 10.

17. The coated substrate prepared by the method of claim 11 in which the film is cured and electrically conductive.

18. The silicone rubber prepared by the method of claim 14 which is cured and electrically conductive.

19. A method of regenerating an emulsion to provide a curable composition wherein the emulsion after having been prepared by the method of claim 1 has lost its ability to cure, consisting essentially of adding a silane as defined in claim 1, a metallic salt of a carboxylic acid as defined in claim 1 or both to an emulsion prepared by the method of claim 1 which does not cure to a silicone rubber on deposition from the emulsion whereby a curable silicone rubber can be deposited from the regenerated emulsion.

20. The regenerated emulsion prepared by the method of claim 19.

References Cited
UNITED STATES PATENTS

| | | | |
|---|---|---|---|
| 2,891,923 | 6/1959 | Phreaner | 260—29.2 M |
| 3,127,363 | 3/1964 | Nitzsche et al. | 260—46.5 G |
| 3,294,725 | 12/1966 | Findlay et al. | 260—29.2 M |
| 3,355,406 | 11/1967 | Cekada | 260—29.2 M |
| 3,360,491 | 12/1967 | Axon | 260—29.2 M |

DONALD J. ARNOLD, Primary Examiner

A. H. KOECKERT, Assistant Examiner

U.S. Cl. X.R.

117—126 GE, 160 A, 161 ZB; 252—511; 260—2.3, 18 S, 29.2 M, 37 SB, 46.5 G; 264—331